United States Patent
Zhu et al.

(10) Patent No.: US 6,728,380 B1
(45) Date of Patent: Apr. 27, 2004

(54) ADAPTIVE NOISE SUPPRESSION SYSTEM AND METHOD (75) Inventors: G. George Zhu, Columbus, IN (US); Anupam Gangopadhyay, San Antonio, TX (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/265,805

(22) Filed: Mar. 10, 1999

(51) Int. Cl.[7] .............................. A61F 2/20; A61F 11/06; H04B 1/00
(52) U.S. Cl. .................. 381/71.4; 381/71.1; 381/71.11; 381/71.12; 381/86
(58) Field of Search ............... 381/71.1, 71.4, 381/71.11, 71.12, 94.1, 86

(56) References Cited

U.S. PATENT DOCUMENTS

| | | |
|---|---|---|
| 4,044,241 A | 8/1977 | Hatley, Jr. |
| 4,064,747 A | 12/1977 | Rackliffe et al. |
| 4,347,570 A | 8/1982 | Akiyama et al. |
| 4,428,348 A | 1/1984 | Takase et al. |
| 4,977,559 A | 12/1990 | McCambridge |
| 5,115,396 A | 5/1992 | Keegan |
| 5,200,898 A | 4/1993 | Yuhara et al. |
| 5,272,659 A | 12/1993 | Starr |
| 5,353,174 A | 10/1994 | Uno |
| 5,418,857 A * | 5/1995 | Eatwell ...................... 381/71.4 |
| 5,425,105 A | 6/1995 | Lo et al. |
| 5,426,704 A * | 6/1995 | Tamamura et al. ......... 381/71.9 |
| 5,426,705 A * | 6/1995 | Yokota et al. ............. 381/71.4 |
| 5,483,927 A | 1/1996 | Letang et al. |
| 5,485,523 A * | 1/1996 | Tamamura et al. ......... 381/71.4 |
| 5,493,616 A * | 2/1996 | Iidaka et al. ............... 381/71.4 |
| 5,530,764 A * | 6/1996 | Uchida et al. ............. 381/71.14 |
| 5,532,929 A | 7/1996 | Hattori et al. |
| 5,553,154 A * | 9/1996 | Tamamura et al. ...... 381/71.12 |
| 5,577,127 A | 11/1996 | Van Overbeek |
| 5,636,621 A | 6/1997 | Maki et al. |
| 5,638,305 A * | 6/1997 | Kobayashi et al. ......... 700/280 |
| 5,642,722 A | 7/1997 | Schumacher et al. |
| 5,665,906 A | 9/1997 | Bayer |
| 5,701,349 A * | 12/1997 | Sano et al. ................ 381/71.4 |
| 6,002,778 A * | 12/1999 | Rossetti et al. ............ 381/71.4 |

* cited by examiner

*Primary Examiner*—Xu Mei
*Assistant Examiner*—Laura A. Grier
(74) *Attorney, Agent, or Firm*—Barnes & Thornburg (57) ABSTRACT

A system and method for suppressing cyclic noise components of a sampled sensor signal generates an error compensation signal that is subtracted from the sampled sensor signal to produce a corrected signal. A moving average of the sampled sensor signal, or sensor error signal, is obtained that corresponds to an error signal free of the non-cyclic component. An adaptive noise compensation algorithm is implemented by a compensation module with a minimum number of multiplications. The compensation module relies upon a unit base vector having a length equal to the number of base functions used to represent the cyclic noise component of the sensor signal, or equal to the number of samples over the sampling interval of the cyclic noise. This base vector is multiplied by an adaptive gain, which is a function of the difference between the sensor error signal and a compensation signal output from the adaptive compensation module. A convergence gain module outputs a high gain or a low gain value that is multiplied by unit base vector to control the rate of convergence of the adaptive algorithm. An adaptive vector is the product of this multiplication, then passed through a one sampling period delay operator, and then combined as an inner product with the unit base vector to produce the adaptive compensation signal.

22 Claims, 4 Drawing Sheets

ADAPTIVE NOISE SUPPRESSION SYSTEM AND METHOD

BACKGROUND OF THE INVENTION

The present invention concerns a system and method for the suppression of noise infiltrating a signal from a sensor. More particularly, the invention concerns an algorithm-based approach for suppressing cyclic noise.

Most modern vehicles utilize some form of microprocessor for controlling the operation of various functional components of the vehicle. For instance, automotive vehicles utilize an engine control module that carries out instructions for controlling the performance of the engine, as well as for monitoring that performance. More specifically, the control microprocessor implements a set of algorithms that receive information concerning the current state of the engine, and that use the information for determining subsequent action for each of the functional components.

Figure 1:
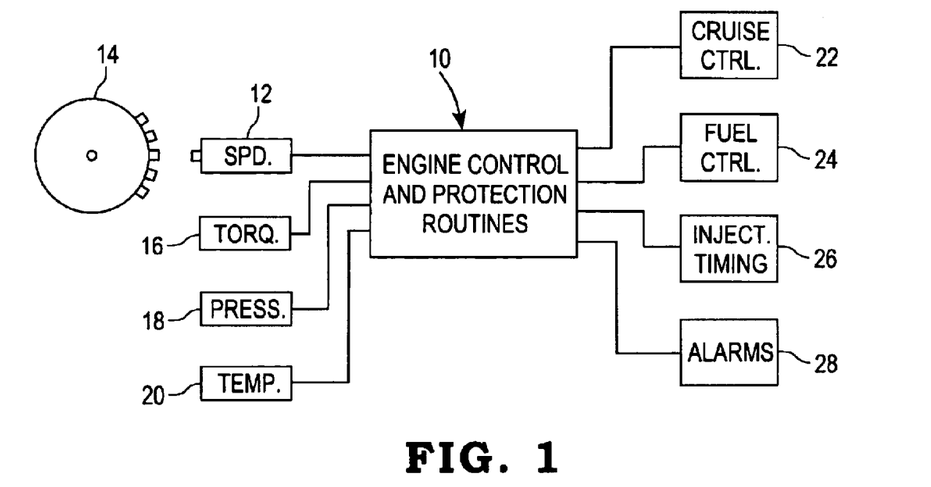
FIG. 1 is a block diagram of an engine control module connected to various sensors and peripheral control components.

For example, as shown in FIG. 1, a typical vehicle electronic control system can include an engine control module (ECM) 10 that implements a number of engine control and protection routines as described above. The ECM 10 receives signals from various sensors disposed throughout the vehicle. For example, a speed sensor 12 determines the rotational speed of the engine. In a typical installation, the speed sensor 12 constitutes a Hall-type sensor that registers the passage of teeth on a tone wheel 14. In some applications, the array of sensors can also include a torque sensor 16 that measures the torque at the engine crankshaft. An array of pressure sensors 18 and temperature sensors 20 can transmit corresponding signals from various locations in the engine, such as at the intake and exhaust manifolds.

After receiving the signals from these various sensors 12, 16, 18 and 20, the ECM 10 provides output signals to various functional components. For instance, a cruise control module 22 can receive and return signals from the ECM to maintain a particular vehicle speed. A fuel control module 24 controls the amount of air and liquid fuel introduced into the engine combustion cylinders. An injection timing module 26 can determine the timing of injection, and ultimately ignition, in a multiple cylinder engine. Finally, an array of signals and alarms 28 can alert the vehicle operator of engine operating parameters that exceed predetermined thresholds.

As with any electronic or software based system, the function of the ECM 10 relies upon the integrity of the information provided to the ECM. Thus, if data from each of the sensors is suspect, the control signal provided by the ECM 10 to each of the functional elements 22, 24, or 26, may be erroneous. For example, bad data from the speed sensor 12 may lead to vehicle speed surges when the cruise control module 22 is in operation. Discrepancies in the signals from the pressure sensors 18 or temperature sensors 20 may cause errors in airflow calculations, which will affect the signals presented to the fuel control component 22 or injection timing component 26. These types of errors can lead to poor combustion, and even engine knock. Moreover, bad data from the various sensors can severely effect the fuel economy and operating efficiency of an engine.

One external phenomenon that has a significant effect on the integrity of sensor data is noise generated by various components of the engine. The noise can include electrical noise or EMF associated with electrical components of the engine and vehicle. In addition, the periodic engine combustion event generates its own type of cyclic noise that infiltrates the signals from most sensors disposed throughout the engine and vehicle. In order to preserve the integrity of the sensor data, it is necessary to account for this extraneous noise. Preferably, the noise is removed from the sensor signals so that a noise-free signal is provided to and utilized by the ECM 10.

In one approach, the sensor signals are passed through an array of band pass filters. One detriment of these filters is that they tend to reduce the response time of the sensor signals as they are being provided to the control module. In addition, band path filters reduce the bandwidth of the signals that can be received from each sensor, which can lead to clipping and attenuation problems. In another approach, a moving average filter is utilized over each engine cycle. Again, this type of filter causes delay and can reduce the signal bandwidth.

Figure 2:
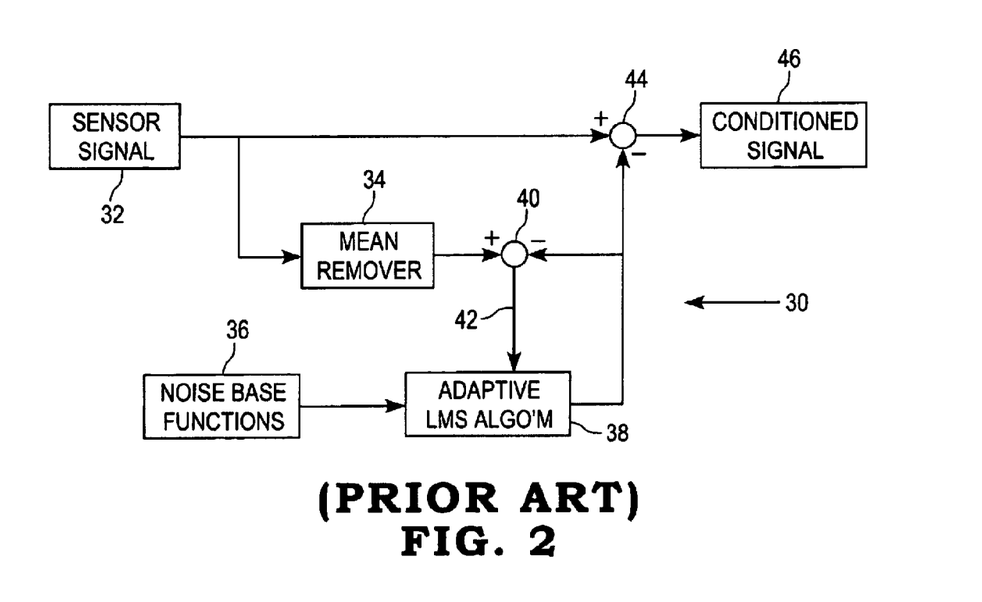
FIG. 2 is a block diagram of a least mean square adaptive filter of the prior art.

Another prior art approach is depicted in the block diagram of FIG. 2. In this approach, the sensor signal 32 is subject to an adaptive least means square algorithm. The signal 32 is provided to a mean remover 34 that essentially eliminates any DC or non-cyclic component of the signal, leaving substantially all of the cyclic noise component of the sensor signal. In an important aspect of this prior art approach, a noise base function generator 36 generates sine and cosine functions at given frequencies. The noise function generator 36 is based on the principle that any fixed frequency signal with known magnitude and phase delay can be obtained by the linear combination of several sine and cosine functions. Thus, these prior art devices utilize essentially a noise signal generator that produces cyclic signals corresponding to the expected components of the noise infiltrating the sensor signal 32.

The sensor signal, after it has had its DC component removed by element 34, together with the noise signals from the component 36, are fed to an adaptive least means square algorithm module 38. The adaptive module can include a multiplexer to sequentially provide the various sine and cosine noise signals generated by the component 36. In addition, the adaptive module 38 performs a series of multiplications and additions to produce the least means square output signal that is ultimately subtracted from the sensor signal 32 at a summing node 44. The result of this subtraction is the conditioned signal 46 that is, in essence, a "noiseless" sensor signal.

The adaptive feature of this prior art approach is that the output from the adaptive algorithm component 38 is subtracted from the sensor signal 32 after it has had its DC component removed in element 34 for input to the least mean square component 38. Thus, a summing node 40 subtracts the output of the adaptive component from the sensor signal to yield an adaptive input signal 42.

While the adaptive least means square algorithm approach of the prior art shown in FIG. 2 adequately suppresses fixed frequency noise, it suffers from certain problems. For instance, in order to obtain the moving average at the mean remover component 34, as well as the adaptive algorithm output from component 38, up to fourteen multiplications are required for each data sampling cycle, based upon an assumption that the noise signal includes six cyclic components. This intensive computational throughput makes it difficult for the adaptive LMS filter to be implemented in a real-time environment.

What is needed, therefore, is a noise suppression system and method that can adequately address cyclic noise that infiltrates sensor signals. This system and method must have only minimal computational requirements so that it can be implemented in a real-time environment.

SUMMARY OF INVENTION

In view of these needs, the present invention contemplates an engine control system comprising a number of condition sensor disposed throughout an internal combustion engine, each sensor operable to generate a sensor signal at predetermined sampling intervals that includes a cyclic noise component to be removed. A noise compensation filter receives the sensor signal and includes means for adaptively suppressing at least a portion of the cyclic noise component within said sensor signal to generate a corrected signal at each sampling interval.

In one embodiment, the noise compensation filter generates an error compensation signal that is subtracted from the sampled sensor signal to produce a corrected signal. A moving average of the sampled sensor signal, or sensor error signal, is obtained that corresponds to an error signal free of the non-cyclic component. An adaptive noise compensation algorithm is implemented with a minimum number of multiplications. In one feature of the invention, the compensation module relies upon a unit base vector having a length equal to the number of base functions used to represent the cyclic noise component of the sensor signal. This base vector is multiplied by an adaptive gain to produce an adaptive vector. The adaptive gain can be a function of the difference between the sensor error signal and a compensation signal output from the adaptive compensation module.

In another aspect of certain embodiments of the invention, a convergence gain module outputs a high gain or a low gain value that is applied to yield the adaptive vector to control the rate of convergence of the algorithm. The resulting adaptive vector is held in memory, a buffer or similar delay operator. In the preferred embodiment, a prior adaptive vector is combined as an inner product with the unit base vector to produce the adaptive compensation signal at the current sampling interval.

In another feature, a convergence calculation module generates a convergence signal when the noise compensation filter sufficiently converged—i.e., has suppressed substantially all of said cyclic noise component of the sensor signal. This convergence signal can then be provided to an engine control module, which includes inputs for receiving the sensor signal and the corrected signal. Routines within the engine control module can perform operations on either the sensor signal or the corrected signal as a function of the convergence signal. For example, certain routines require a substantially pure signal from a particular sensor. In this case, those routines will wait until the convergence signal indicates that the adaptive algorithm has converged before using the conditioned or corrected signal.

In certain embodiments, the convergence determination is made as a function of the difference between the error compensation signal at the current sampling interval and the error compensation signal at a prior sampling interval. Likewise, the gain value applied to the adaptive noise compensation filter can be a function of this difference. In each case, an appropriate threshold value can be predetermined against which this difference is compared. In the instance of the gain value, a first gain magnitude can be applied if the difference is outside a threshold value indicative that the adaptive algorithm has not sufficiently converged. A higher gain value will accelerate this convergence. On the other hand, if the difference value falls within the threshold value, the algorithm is determined to be sufficiently converged and a lower gain value can be provided to the compensation filter.

One benefit of the present invention is that only a minimal number of time-consuming multiplications are required over each sampling interval to adaptively converge to a sufficient noise compensation signal. This benefit is accomplished by utilizing a unit base vector corresponding to the number of cyclic functions that would otherwise be used to simulate the noise signal component. The frequency, magnitude and phase aspects of these cyclic functions are simulated by the gain value applied to the base vector to yield the adaptive vector.

Another benefit of the present invention is that the gain value used by the adaptive algorithm is a function of the difference between the compensation signal and the noise signal component extracted from the sampled sensor signal. In addition, the gain value can also be increased to achieve more rapid convergence, or decreased when the adaptive algorithm has converged to a compensation signal that will remove substantially all of the noise signal component.

These and other benefits, as well as particular object of the invention will become apparent upon consideration of the following written description and accompanying figures.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alternations and further modifications in the illustrated devices, and such further applications of the principles of the invention as illustrated therein being contemplated as would normally occur to one skilled in the art to which the invention relates.

The present invention contemplates a system and method for suppressing cyclic noise in a sensor signal. An adaptive approach is implemented so that the noise suppression algorithm can adapt to different engine configurations and operational conditions. In general terms, the inventive system and method obtains a sampled sensor signal and performs one multiplication in generating a sensor error signal in a moving average calculation. This sensor error signal, which essentially represents the cyclic noise component of the sensor signal, is fed to an adaptive noise compensation filter that produces an error compensation signal. This error compensation signal is subtracted from the original sampled signal to produce a corrected sensor signal having the noise signal removed.

The inventive system further includes a convergence calculation component that receives the error compensation signal from the adaptive noise compensation filter and uses that signal to generate an adaptive algorithm gain value. This gain value is fed back into the adaptive noise compensation filter to yield a further adaptive feature of the invention. It is contemplated that the convergence calculation component can provide a high gain value to accelerate the convergence of the error compensation signal generated by the compensation filter. When a steady state condition is reached, the convergence calculation component can generate a low gain to be applied to the adaptive noise compensation. Convergence of the adaptive algorithm can be assured for gain values within a predetermined range.

The convergence calculation component also produces a signal readiness indicator that is generated as a function of the magnitude of the error compensation signal. In particular, if the error compensation signal falls outside a predetermined limit, the readiness indicator will have a specific value, which value will trigger the high gain output of the convergence calculation component. On the other hand, if the error compensation signal falls within the predetermined limit, the signal readiness indicator is assigned a different value, which corresponds to the low gain value.

Figure 3:
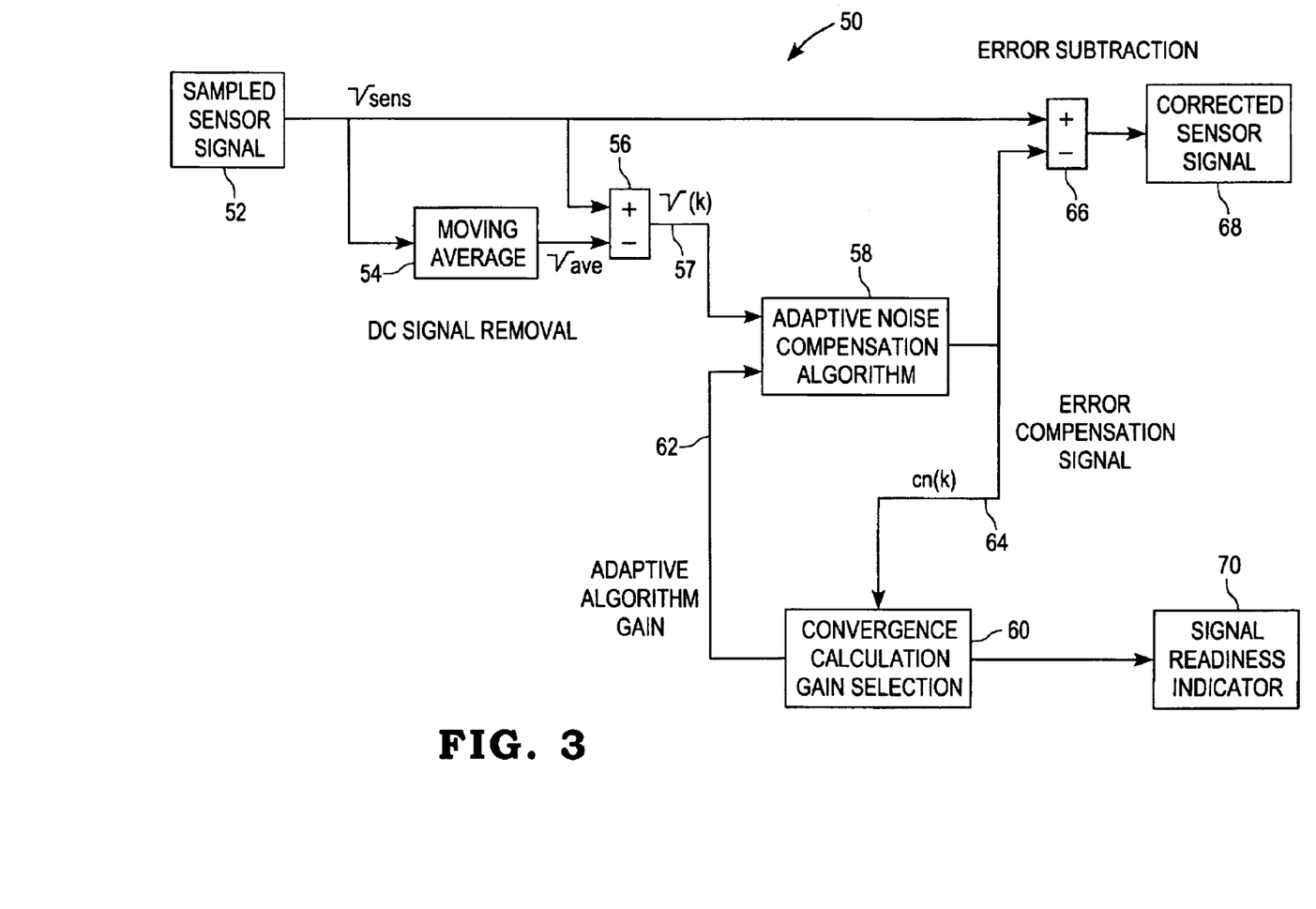
FIG. 3 is a block diagram of an adaptive noise suppression system in accordance with one embodiment of the present invention.

In accordance with the one embodiment of the present invention, an adaptive sensor noise suppression system 50 is provided, as depicted in the block diagram of FIG. 3. The system 50 receives a sampled sensor signal 52 from an external sensor, such as the engine speed sensor 12 shown in FIG. 1. This sample sensor signal 52 includes a signal that is indicative of the actual speed of the tone wheel 14 and ultimately the engine speed, as well as superimposed cyclic noise signals of various known frequencies. The frequencies of these noise signals are known for various engine operating conditions and events. For example, the periodic opening and closing of the cylinder intake and exhaust valves generate a cyclic noise signal that can affect the output signal of certain condition sensors.

Cyclic noise signals can be represented by a sine function having a magnitude and phase delay. In most cases, the magnitude and phase delay are unknown. Thus, using conventional signal analysis techniques, any cyclic noise component can be represented as a combination of sine and cosine functions at predetermined angular frequencies. A composite noise signal can be represented by the equation:

$$n(k) = \sum_{i=1}^{3} [a_i(k) * \sin(\omega_i T_s k) + b_i(k) * \cos(\omega_i T_s k)], \quad (1)$$

where $T_s$ is the sample period and $k_p$ is the number of sensor signal sample points.

According to this equation, a number of angular frequencies $\omega_i$ can be utilized to simulate a cyclic noise components. It has been found that for most cyclic engine noise sampled six times per period, three such angular frequency components address the great majority of the noise signals. Thus, in accordance with the present invention, sine and cosine functions at three frequencies $\omega_1$, $\omega_2$, and $\omega_3$ are combined to produce the anticipated aggregate noise signal.

The sensor signal is based upon a sampling rate that is related to the three noise signal frequencies. In particular, the number of samples, $k_p$, and the sampling period $T_s$, are created so that the product of the two values is a minimum common multiplier of each of the cyclic noise frequencies. For example, the signal from the pressure sensor 18 is subject to additive cyclic noises causes by engine intake and exhaust valve events. If the minimum common frequency among those events is every two cycles (720°), and the pressure is sampled every 30° of crank angle rotation, then the number of sample points, $k_p$, equals 720 divided by 30, or $k_p$=24. With this sampling rate, all of the relevant noise components are accounted for in the sampled sensor signal 52.

Once the sensor signal is obtained, the DC component of the signal is removed. This DC component essentially corresponds to the moving average of the signal, or more particularly, the non-cyclic signal component indicative of the actual sensed value. The noise suppression system 50 includes a moving average filter 54 that can operate in a standard manner to extract all but the noise signals from the sampled sensor signal 52. In one approach, the moving average value $V_{ave}(k)$ is obtained from the following equation, where $V_{sens}(k)$ is the sampled sensor signal 52:

$$V_{ave}(k) = \frac{1 + z + \dots + z^{k_p-1}}{k_p * z^{k_p-1}} * V_{sens}(k), \text{ where } z^{-i} \text{ is a delay operator.} \quad (2)$$

The value $V_{ave}(k)$ is subtracted from the sampled sensor signal 52 at the summing node 56. The output of this summing node is the sensor error 57, designated v(k) herein. In effect, this sensor error 57 constitutes the noise component of the sampled sensor signal 52. The remaining elements of the noise suppression system 50 then operate on the sensor error signal 57 to generate an error compensation signal cn(k) which is ultimately subtracted from the sampled sensor signal 52, $V_{sens}(k)$.

To accomplish this noise suppression, the sensor error signal 57 is provided to an adaptive noise compensation filter 58. The output of this component is the error compensation signal 64, cn(k). This signal 64 is subtracted from the sampled sensor signal 52 at a summing node 66. The output of this error subtraction is the corrected sensor signal 68, which is an essentially pure representation of the value sensed by the particular engine condition sensor.

As a further component of the noise suppression system 50, a convergence calculation gain component 60 receives the error compensation signal 64. This component 60 produces an adaptive algorithm gain signal 62 that is provided to the noise compensation filter 58. The noise compensation filter 58 uses this gain in conjunction with the sensor error signal 57, to essentially iterate to a solution. An additional output from the convergence calculation component 60 is a signal readiness indicator 70. This indicator 70 identifies whether the iterative or adaptive process executed by the components 58 and 60 has reached a steady state condition. When it has, error compensation signal 64 substantially corresponds to the actual noise signal superimposed on the true value of the sensed condition within the sample sensor signal 52.

Figure 4:
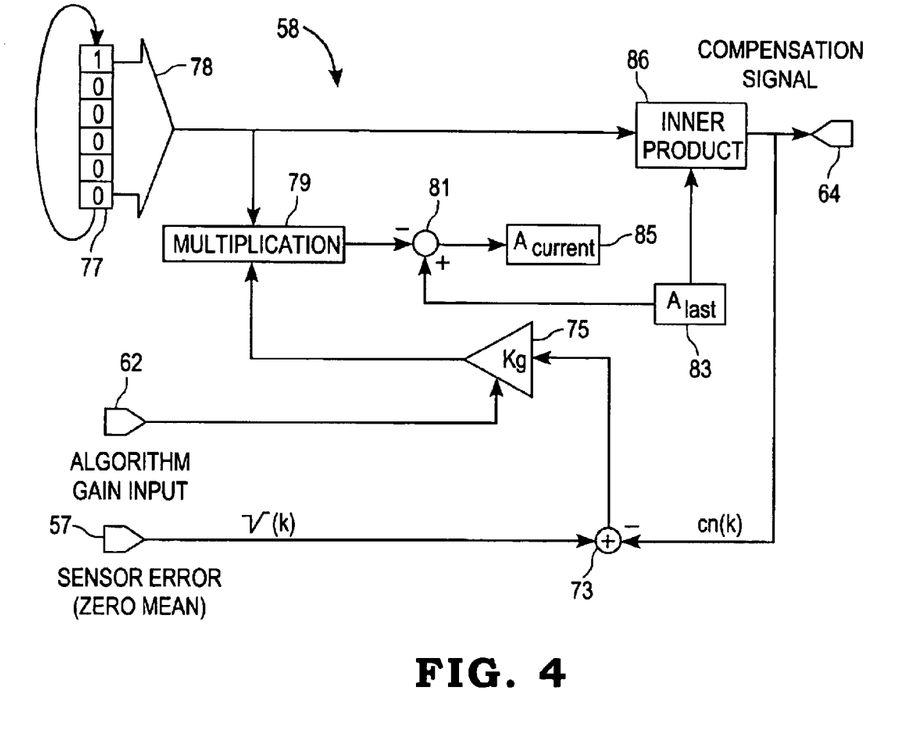
FIG. 4 is a block diagram of an adaptive noise compensation filter of the system shown in FIG. 3.
Figure 5:
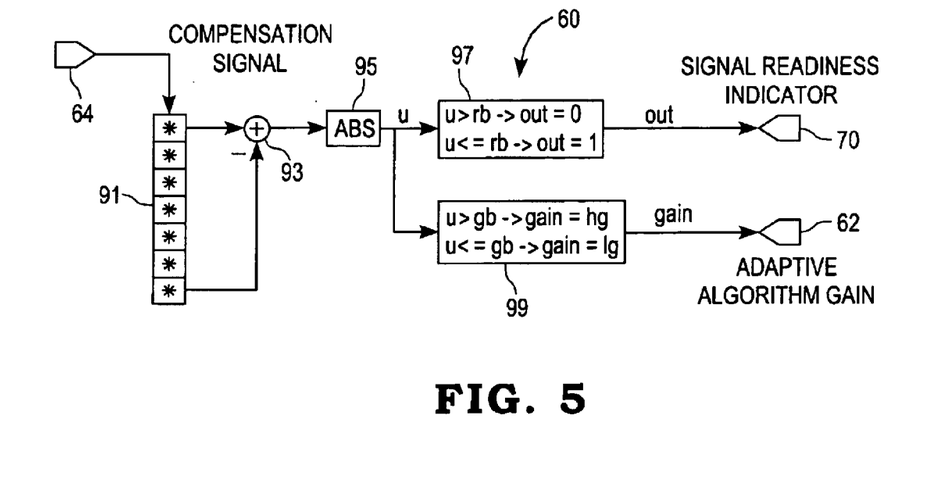
FIG. 5 is a block diagram of a convergence calculation component of the system shown in FIG. 3.

While the general components of the noise suppression system 50 are shown in FIG. 3, details of the filter components 58 and 60 are shown in FIGS. 4 and 5, respectively. The adaptive noise compensation filter 58 receives the sensor error signal 57 and algorithm gain signal 62 as inputs. The output of the suppression component is the error compensation signal 64, cn(k). In the illustrated embodiment, it is assumed that the various noise signals infiltrating the sampled sensor signal 52 require three angular frequencies and six sample points to be properly defined.

In accordance with the preferred embodiment of the present invention, the noise compensation filter 58 relies upon a matrix approach to adaptively generate the compensation signal 64. The root of this matrix approach is the understanding that the noise signal, n(k), is the sum of sine and cosine functions at particular angular frequencies. The noise signal can be given by equation (1) above. The coefficients $a_i(k)$ and $b_i(k)$ are given by the following matrix equation:

$$\begin{bmatrix} a_1(k) \\ b_1(k) \\ \vdots \\ b_3(k) \end{bmatrix} = \begin{bmatrix} a_1(k-1) \\ b_1(k-1) \\ \vdots \\ b_3(k-1) \end{bmatrix} + \begin{bmatrix} \sin[\omega_1 T_s(k-1)] \\ \cos[\omega_1 T_s(k-1)] \\ \vdots \\ \cos[\omega_3 T_s(k-1)] \end{bmatrix} * K_g * [v(k-1) - cn(k-1)], \quad (3)$$

where $K_g$ is a gain applied to the difference between the sensor error signal and the error compensation signal to achieve convergence.

Again, in the illustrated embodiment six samples are being used, so six periodic functions are combined to form the noise signal n(k), namely three sine and three cosine components at three different frequencies, $\omega_1$, $\omega_2$, and $\omega_3$. This matrix equation converges to a solution when the coefficients $a_i(k)$, $b_i(k)$ equal $a_i(k-1)$ and $b_i(k-1)$, respectively. In other words, the solution to equation (1) for the noise signal is obtained when the current coefficients equal the previous coefficients. Under that condition, the compensation signal cn(k) is equal to the sensor error signal v(k).

It has been found that this matrix relationship and convergence aspect can be readily simulated using a stored column unit base vector and a gain $K_g$ generated by the convergence calculation component 60. The unit base vector is stored in a buffer or memory register 77, as shown in FIG. 4. A multiplexer 78 cycles through the base vector components, as represented by the cyclic arrow. Thus, for each sampling point, the multiplexer cycles the position of the unit value to correspond to the particular noise signal component—i.e., sin ($\omega_1$) . . . COS($\omega_3$), in the specific example.

The sensor error signal 57, v(k), and the adaptive compensation signal 64, cn(k), are subtracted at a summing node 73. The result of this subtraction is provided to a gain component 75. The output of the component 75 is the gain $K_g$ which is the product of the adaptive algorithm gain input 62 and the output from the summing node 73.

The gain output $K_g$ is provided to multiplication component 79 where it is multiplied by unit base vector in register 77. This product is combined at a summing node 81 with a prior calculated adaptive column vector $A_{last}$ obtained from memory location 83. This adaptive column vector $A_{last}$ is used to produce the newest adaptive column vector $A_{current}$ that is stored in memory location 85. Preferably, the adaptive vector $A_{last}$ is stored in a short-term delay memory and replaced with the current value of the adaptive vector $A_{current}$ from memory location 85 once the prior vector $A_{last}$ has been provided to the summing node 81. Preferably, the delay memory holds the last adaptive vector for one sample period. It is understood that the adaptive column vector $A_{current}$ stored in memory location 85 eventually becomes the prior adaptive column vector $A_{last}$ stored in memory location 83. Of course, when the adaptive noise compensation algorithm implemented by filter 58 is initially executed, the adaptive column vector $A_{last}$ is a null vector.

The compensation signal 64, cn(k), is the result of taking the inner product component 86 of the column unit base vector in register 77 and the prior adaptive vector $A_{last}$ in memory location 83. As is known from vector algebra, the inner product is the sum of the product of the row elements of each vector. Since the column unit base vector 77 is only a series of ones or zeros, the inner product generated by the module 86 does not require any multiplications. Instead, the row of the adaptive column vector $A_{last}$ that corresponds to a non-null row of the unit base vector 77 is passed on, or summed, by the inner product module 86.

The compensation signal output 64 is then provided to the summing node 66 to be subtracted from the sampled sensor signal 52, as shown in the diagram of FIG. 3. In addition, as part of the adaptive aspect of the noise compensation filter 58, this compensation signal 64, cn(k), is fed back into the module to modify the gain value $K_g$, as described above.

One of the inputs to the noise compensation filter 58 is the adaptive gain signal 62. This adaptive gain signal is generated by the convergence calculation component 60, details of which are shown in FIG. 5. The component 60 receives the error compensation signal 64, cn(k), as its and stores the value in a memory register 91. In the preferred embodiment, a predetermined number of compensation signals from previous sample periods are maintained in memory, seven in the illustrated embodiment. The top-most element of the register is the most recently stored value for the compensation signal 64, while the lower-most is the value from the oldest sample period.

In accordance with the preferred embodiment of the convergence calculation component 60, the oldest value for the compensation signal 64 in register 91 is subtracted from the most recent compensation signal value at summing node 93. The absolute value of this difference, designated u, is obtained in module 95. The module 60 includes two switch components 97 and 99. The first switch component 97 produces a readiness indicator signal 70. In the preferred embodiment, this signal 70 is either a one or a zero, with one indicating that the adaptive noise compensation algorithm has converged to a solution.

This convergence is determined by the absolute value of the difference between the current compensation signal in the register 91 and the oldest compensation signal. In the specific embodiment, when the value u is greater than a readiness boundary value rb, the output for the readiness indicator signal 70 is zero, meaning that the adaptive compensation algorithm has not converged. On the other hand, if the value u is less than the boundary value rb, the readiness indicator signal has a value of one, meaning that the algorithm has converged and the error compensation signal 64 sufficiently corresponds to the actual noise signal superimposed within the sampled sensor signal 52.

The second switch 99 determines the magnitude of the adaptive algorithm gain 62 that is provided to the noise compensation filter 58. Again, this switch relies upon the magnitude of the value u. If the value u is greater than a gain boundary value gb, a high gain value, hg, is output as the adaptive algorithm gain signal 62. In this circumstance, the high gain value hg is indicative that the compensation algorithm has not converged to a solution. The high gain will then hasten that convergence.

On the other hand, if the value u is less than the gain boundary gb, the adaptive algorithm gain value signal 62 is set at a low gain value lg. In this condition, the algorithm has converged and the low gain value lg for signal 62 will maintain the compensation signal 64, absent some perturbation in the actual sampled sensor signal 52. In a preferred embodiment, the high gain value is ten times greater then the low gain value. In a specific embodiment, the high gain value can be 0.30, while the low gain value can be 0.03. It is believed that convergence of the adaptive algorithm of the present invention can be guaranteed with gain values within a predetermined range. In a specific embodiment, that range corresponds to a gain value less than 2.00.

In the preferred embodiment, the readiness boundary value rb and the gain boundary value gb are different values. The gain boundary value gb operates to control the rate of convergence of the adaptive noise compensation algorithm implemented by module 58. On the other hand, the readiness indicator rb is a measure of the degree of convergence of the algorithm. Thus, in a specific embodiment, the readiness indicator value rb will have a smaller magnitude than the gain boundary value gb. As the error compensation signal 64 (cn(k)) decreases, the adaptive gain value 62 will switch from the high gain value hg to the low gain value lg. As the error compensation signal continues to decrease, the readiness indicator will change state from zero to one, indicating that the algorithm has sufficiently converged for the compensation signal to be useful in suppressing the noise component signal.

Alternatively, instead of utilizing the value u and the gain boundary gb, the switch could use the readiness indicator signal 70. When the signal has a value of zero, the adaptive algorithm gain 62 can be set to the high gain value hg. When the readiness indicator signal 70 is one, meaning that convergence has occurred, the adaptive gain signal 62 can be set to the low gain value lg.

The readiness boundary value rb and gain boundary value gb can be predetermined and maintained in a memory accessed by the convergence gain calculation module 60. These boundary values can vary depending upon the nature of the sampled sensor signal and the character of the noise signal sought to be suppressed. For instance, signals from certain sensors may not need to be as pure or noise-free as other sensor signals, depending upon the use put to those signals by the ECM 10. In that case, a wider range of acceptable conditioned sensor signal values may be acceptable, which means that strict convergence of the error compensation signal is not essential.

As a further modification, additional boundary values can be utilized. For instance, an intermediate gain boundary value can be imposed to yield a medium gain value from the convergence gain component 60. Similarly, an intermediate readiness boundary value can be applied. In this instance, the signal readiness indicator 70 could no longer constitute a simple binary value, but must instead have three states for output.

As shown in FIG. 3, the corrected sensor signal 68 is being continuously generated, even when the compensation algorithm has not converged. Thus, in one embodiment the readiness indicator signal 70 can be used to block the output of the corrected sensor signal 68 until convergence has occurred. Thus, a switch can be interposed between the summing node 66 and the output of the signal 68. The switch can hove a first position in which the signal is blocked when the readiness indicator signal 70 has a value of zero, and a second position in which the signal is output when the indicator signal 70 has a value of one. In this way, control routines using the sensor signal will only receive corrected signal values, thereby avoiding integrity problems in subsequent calculations.

The noise suppression system 50 and its noise compensation module 58 and convergence calculation module 60, can be implemented in an electronic circuit, or a series of software instructions within the ECM 10. The present invention provides significant advantages over prior devices for addressing sensor noise. The gain scheduling aspect of the convergence calculation component 60, and particularly the second switch 99, allows the adaptive algorithm to converge more quickly when the signal error is large. On the other hand, when the signal error is small, the low gain feature allows the adaptive compensation algorithm to be more robust to minor sensor signal variations.

It is understood that the noise suppression filter 58 and corresponding algorithm are implemented for each sensor signal sampling period. For each sampling period, only two multiplications are required, in contrast to the dozen or more multiplications necessary with prior approaches. Since the noise suppression algorithm relies upon compensation within the time domain, there is no reduction in the bandwidth of the sampled sensor signal 52. Moreover, since the system 50 requires a minimum of multiplications, the algorithm converges very rapidly, usually within one second for most sensor noise components. The inventive technique provides means for addressing multiple noise base functions, so that most of the sensor error attributable to cyclic noise can be eliminated. In a typical case, more than 90% of the sensor error is eliminated or suppressed using the present invention.

In a modification of the system 50, the readiness indicator signal 70 can be used to identify the nature of the compensation signal 64 being output from the component 50. In some instances, the modules utilizing this signal can use the original sensor signal 52, or the compensated signal 64. More particularly, some subsequent modules can use the compensation signal before convergence has occurred. In these instances, the value of the readiness indicator signal. 70 can be provided to other modules within the ECM 10.

Figure 6:
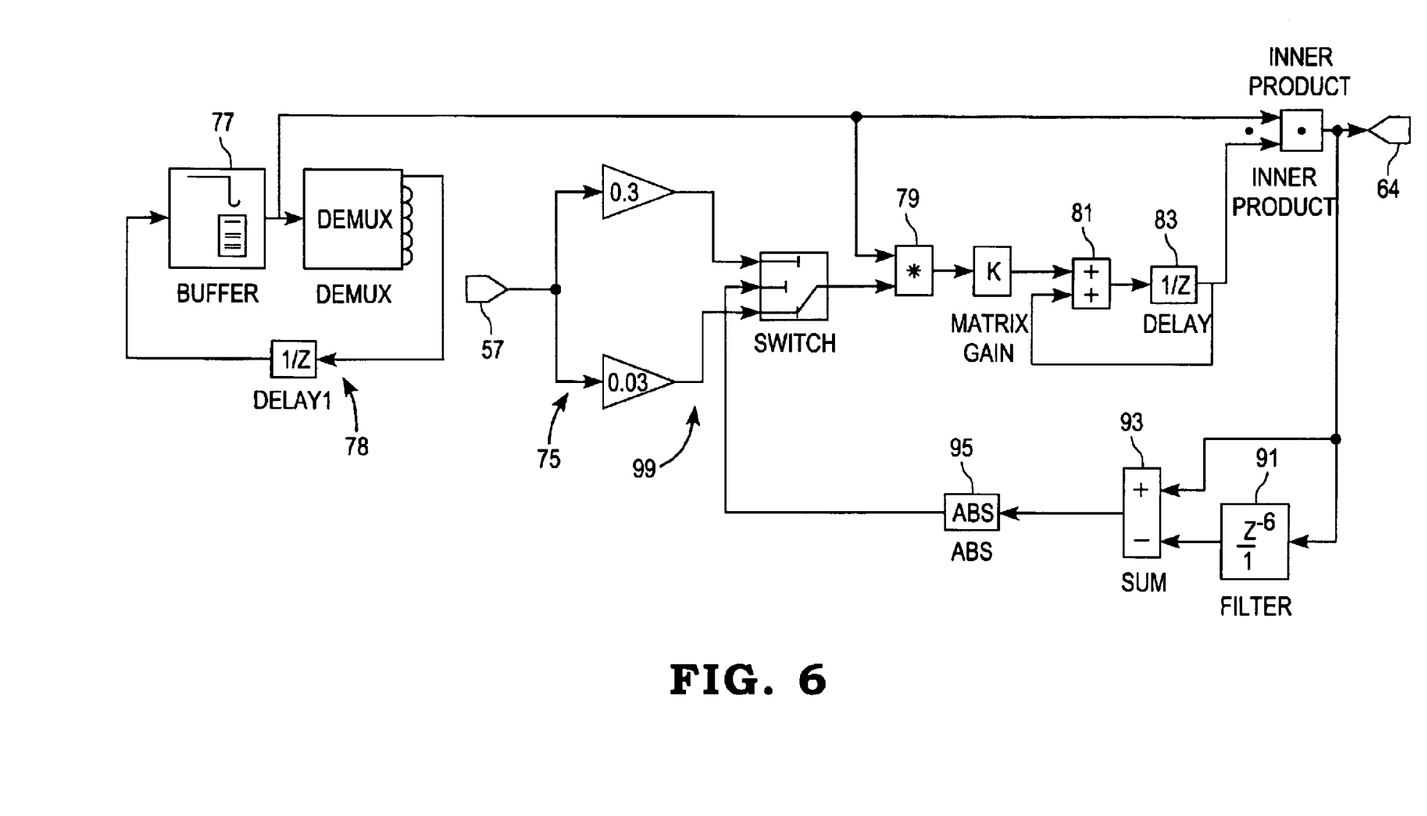
FIG. 6 is a block diagram of a combination of the adaptive noise compensation filter of FIG. 4, and the convergence calculation component of FIG. 5.—has been inserted after the description of FIG. 5 on line 11.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected. For instance, the separate modules depicted in FIGS. 4–5, can be combined as shown in FIG. 6. As shown in this figure, the multiplexer 78 is represented by a one period delay operator and a demultiplexer that shifts the unit base vector maintained in a buffer or register 77. The convergence gain $K_g$ is generated at gain component 75 prior to the gain control switch 99.

As further shown in FIG. 6, with this modification no readiness indicator signal is output. With this embodiment, the element 91 can constitute a six period delay operator so that the summing node 93 can output the difference between the current compensation signal 64 and a prior compensation signal maintained in the delay operator or buffer 91. Similarly, the buffer 83 storing the adaptive vector $A_{last}$ can be a one period delay operator.

What is claimed is:

1. A system for suppressing a cyclic noise component of a signal generated by a condition sensor in an internal combustion engine sampled at predetermined sampling intervals, the system comprising:

means for generating a sensor error signal at each sampling interval including substantially only the cyclic noise component of the sensor signal;

a memory register storing a base vector having a length corresponding to a number of base functions selected to represent the cyclic noise component, said base vector having a unit value at one entry and a null value at the remaining entries;

filter means, operable at each sampling interval, for adaptively generating an error compensation signal at a current sampling interval as a matrix product of said unit base vector and an adaptive vector defined as the product of said base vector and a convergence value proportional to the difference between said sensor error signal at a prior sampling interval and said error compensation signal at a prior sampling interval;

means for storing said error compensation signal at said current sampling interval for subsequent use by said filter means as said error compensation signal at said prior sampling interval; and means for subtracting said error compensation signal from the sensor signal to generate a corrected sensor signal having substantially all of the cyclic noise signal suppressed.

2. The system for suppressing a cyclic noise signal according to claim 1, wherein said filter means includes:

a gain component operable to generate a gain signal applied to said difference between said sensor error and said compensation signals at said prior sampling interval to produce said convergence value.

3. The system for suppressing a cyclic noise signal according to claim 2, wherein said gain component includes means for generating said gain signal having a magnitude as a function of the difference between said error compensation signal at said current sampling interval and said error compensation signal at said prior sampling interval.

4. The system for suppressing a cyclic noise signal according to claim 3, wherein said means for generating is operable to generate said gain signal with a first magnitude when the difference between a current error compensation signal and a prior error compensation signal is outside a predetermined threshold value and a lesser second magnitude when the difference is within said threshold value.

5. The system for suppressing a cyclic noise signal according to claim 3, wherein:

said memory is sized to store said error compensation signal generated during said current sampling interval and at least two prior sampling intervals; and said means for generating said gain signal operates as a function of the difference between said error compensation signal at said current sampling interval and said error compensation signal stored in said memory corresponding to the oldest of said at least two prior sampling intervals.

6. The system for suppressing a cyclic noise signal according to claim 1, wherein said matrix product is an inner product.

7. The system for suppressing a cyclic noise signal according to claim 1, further comprising a convergence indicator operable to generate a convergence signal as a function of the difference between said error compensation signal at said current sampling interval and said error compensation signal at said prior sampling interval.

8. The system for suppressing a cyclic noise signal according to claim 7, wherein said convergence indicator is operable to generate said convergence signal only when the difference between said error compensation signal at said current sampling interval and said error compensation signal at said prior sampling interval within a predetermined readiness threshold.

9. The system for suppressing a cyclic noise signal according to claim 8, wherein:

said memory is sized to store said error compensation signal generated during said current sampling interval and at least two prior sampling intervals; and said convergence indicator operates as a function of the difference between said error compensation signal at said current sampling interval and said error compensation signal stored in said memory corresponding to the oldest of said at least two prior sampling intervals.

10. The system for suppressing a cyclic noise component according to claim 1, wherein said means for generating a sensor error signal includes means for determining a moving average of the sensor signal over said current sampling interval and several prior plurality of sampling intervals.

11. A system for suppressing a cyclic noise component of a sampled signal generated by a condition sensor in an internal combustion engine, the system comprising:

means for generating a sensor error signal from the sampled signal in which a non-cyclic component has been removed;

an adaptive noise compensation module receiving as an input said sensor error signal and a gain value and generating as an output an error compensation signal, said compensation module including;

a register storing a base vector of length $k_p$, where $k_p$ corresponds to a number of base functions selected to represent the cyclic noise component, said base vector having a unit value at one entry and a null value at the remaining $k_p-1$ entries;

a gain multiplier operable to multiply said gain value by the difference between said sensor error signal and said error compensation signal to generate a signal $K_g$;

a vector multiplier operable to multiply said signal $K_g$ by said base vector;

a summing node generating as an output a current adaptive vector signal as the sum of the output of said vector multiplier and a prior adaptive vector signal and having means for storing said current adaptive vector signal for subsequent use as said prior adaptive vector signal; and means for calculating said error compensation signal as the inner product of said prior adaptive vector signal and said base vector; and a convergence calculation module receiving as an input said error compensation signal and generating as an output said gain value, said module including;

means for storing a current value and a plurality of prior values of said error compensation signal;

means for generating a convergence signal corresponding to the magnitude of the difference between said current value of said error compensation signal and one of said plurality of prior values of said error compensation signal obtained from said means for storing; and a gain switch operable to output a first magnitude for said gain value or a second lesser magnitude for said gain value in response to the magnitude of said convergence signal; and means for subtracting said error compensation signal from said sampled sensor signal to generate a corrected sensor signal having substantially all of said cyclic noise signal suppressed.

12. A method for suppressing a cyclic noise component of a signal generated by a condition sensor in an internal combustion engine sampled at predetermined sampling intervals, the method comprising the steps of:

generating a sensor error signal at each sampling interval including substantially only the cyclic noise component of the sensor signal;

storing a base vector having a length corresponding to a number of base functions selected to represent the cyclic noise component, said base vector having a unit value at one entry and a null value at the remaining entries;

at each sampling interval, adaptively generating an error compensation signal at a current sampling interval as a matrix product of the unit base vector and an adaptive vector defined as the product of the base vector and a convergence value proportional to the difference between the sensor error signal at a prior sampling interval and the error compensation signal at a prior sampling interval;

storing the error compensation signal at the current sampling interval for subsequent use by the filter means as the error compensation signal at the prior sampling interval; and subtracting the error compensation signal from the sensor signal to generate a corrected sensor signal having substantially all of the cyclic noise signal suppressed.

13. The method for suppressing a cyclic noise signal according to claim 12, further comprising the step of applying a gain signal to the difference between the sensor error and the compensation signals at the prior sampling interval to produce the convergence value.

14. The method for suppressing a cyclic noise signal according to claim 13, wherein the step of applying a gain signal includes generating the gain signal having a magnitude as a function of the difference between the error compensation signal at the current sampling interval and the error compensation signal at the prior sampling interval.

15. The method for suppressing a cyclic noise signal according to claim 14, wherein the step of applying a gain signal includes generating the gain signal with a first magnitude when the difference between the current error compensation signal and a prior error compensation signal is outside a predetermined threshold value and a lesser second magnitude when the difference is within the threshold value.

16. The method for suppressing a cyclic noise signal according to claim 14, wherein:

the step of storing the error compensation signal includes storing signals generated during the current sampling interval and at least two prior sampling intervals; and the step of applying a gain signal includes generating the gain signal as a function of the difference between the error compensation signal at the current sampling interval and the error compensation signal corresponding to the oldest of the at least two prior sampling intervals.

17. The method for suppressing a cyclic noise signal according to claim 12, wherein the matrix product is an inner product.

18. The method for suppressing a cyclic noise signal according to claim 12, further comprising the step of generating a convergence signal as a function of the difference between the error compensation signal at the current sampling interval and the error compensation signal at a prior sampling interval.

19. The method for suppressing a cyclic noise signal according to claim 18, where in the step of generating a convergence indicator includes generating the convergence signal only when the difference between the error compensation signal at the current sampling interval and the error compensation signal at the prior sampling interval within a predetermined readiness threshold.

20. The method for suppressing a cyclic noise signal according to claim 19, wherein:

the step of storing the error compensation signal includes storing signals generated during the current sampling interval and at least two prior sampling intervals; and the step of generating a convergence indicator includes generating the convergence signal as a function of the difference between the error compensation signal at the current sampling interval and the error compensation signal corresponding to the oldest of the at least two prior sampling intervals.

21. The method for suppressing a cyclic noise component according to claim 12, wherein the step of generating a sensor error signal includes obtaining a moving average of the sensor signal over several sampling intervals.

22. The method for suppressing a cyclic noise component according to claim 12, wherein in the step of storing a base vector the number of base functions corresponds to the number of samples at each sampling interval used to obtain the sampled signal.

* * * * *

UNITED STATES PATENT AND TRADEMARK OFFICE
CERTIFICATE OF CORRECTION

PATENT NO. : 6,728,380 B1
DATED : April 27, 2004
INVENTOR(S) : Zhu et al.

It is certified that error appears in the above-identified patent and that said Letters Patent is hereby corrected as shown below:

Column 4,
Line 37-38, please delete "-has been inserted after the description of FIG. 5 on line 11."

Column 7,
Line 34, please delete "COS" and insert -- cos --.

Column 8,
Line 7-14, please delete "(3)".

Column 9,
Line 1, please delete "Ig" and insert -- 1g --.
Line 61, please delete "hove" and insert -- have --.

Column 10,
Line 35, please delete "signal." and insert - signal --.

Signed and Sealed this

Twentieth Day of July, 2004

JON W. DUDAS
*Acting Director of the United States Patent and Trademark Office*